(No Model.)

F. MALLESON.
FISHING REEL.

No. 284,217. Patented Sept. 4, 1883.

Witnesses.

Inventor.

UNITED STATES PATENT OFFICE.

FREDERICK MALLESON, OF BROOKLYN, NEW YORK.

FISHING-REEL.

SPECIFICATION forming part of Letters Patent No. 284,217, dated September 4, 1883.

Application filed November 18, 1882. (No model.)

*To all whom it may concern:*

Be it known that I, FREDERICK MALLESON, of Brooklyn, Kings county, New York, have invented new and useful Improvements in Reels for Fishing Purposes, of which the following is a description, reference being had to the accompanying drawings, wherein—

Figure 1:
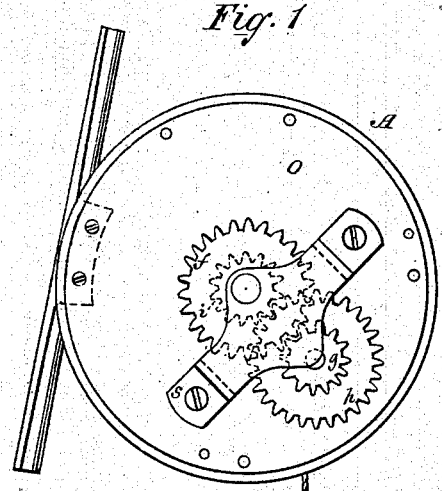
Figure 2:
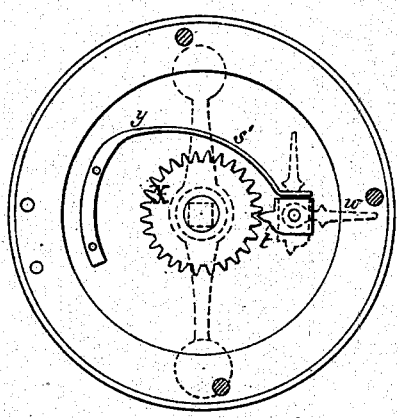
Figure 3:
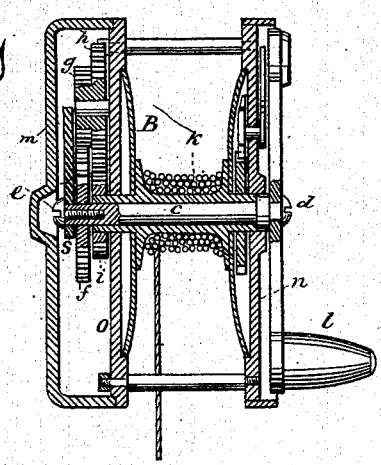

Figure 1 is a plan of the operating-gear and parts therewith connected, the cap having been removed. Fig. 2 is a plan of the under side of what is known as a "click" or "check" reel, and Fig. 3 is a sectional view of the same.

Similar letters indicate similar parts.

The object of my invention is to obtain a more perfectly balanced reel, and to bring the strain as nearly as can be on its center.

My invention consists, mainly, in the employment of a hollow spool-shaft having central bearings, and operated by an independently-revolving driving-shaft which passes through and has its bearings in it, by means of gearing arranged for that purpose. This arrangement gives the two shafts a common center, and the strain is direct and at that point, instead of lying outside of it.

Some details of construction novel in their nature are involved.

Heretofore in nearly all multiplying reels the results desired have been obtained by attaching to the head-plate of the reel a rigid post, upon which revolved a gear-wheel operated by a crank-handle supported by the post, by a revolving plate which substantially constituted a crank-handle, or by a short shaft not extending through the reel, but with a single bearing in the head-plate. The effect in either event was to bring the strain in one direction upon a point between the center and periphery of the head-plate and one side of the reel in another, and reducing the leverage of the crank-handle, and increasing the friction by reason of the lateral strain on the gear-wheel, crank, and main shaft. I have overcome these difficulties and produced a multiplying reel so constructed that I have the benefit of the entire leverage from the center to the periphery of the reel and bring the strain on the longitudinal center of the reel.

In the drawings, A represents a reel constructed, as is usual, with a spool, B, head and tail plates *n* and *o*, respectively, and cap *m*, and with crank-handle *l*. In the arrangement of its parts the reel differs from ordinary reels, in that the operating-gear is transferred to the tail-plate—a decided advantage, as I claim, for the reason that it largely tends to balance the reel both as to its center of gravity and as to the respective forces applied to it by the operation of the crank-handle and the resistance afforded by the fish on the shaft of the spool. It is not, however, essential to the operation of the two shafts that this arrangement should be adopted. The shank or hollow center K of the spool B is continued through and has a bearing in both the head and tail plates *n* and *o*, and thus constitutes a hollow shaft, which on one end is arranged to receive a gear-wheel, *i*. Through this hollow shaft K, and revolving with it, is the driving-shaft *c*, which extends beyond it at both ends—in the one case fitted to receive the crank-handle *l*, and in the other a gear-wheel, *f*, which will revolve directly outside of and parallel to the plane of the gear-wheel *i*.

At a proper point on the tail-plate, (as shown in the drawings, although the head-plate may be employed,) the point to be determined by the size of the gear-wheels, is placed a rigid post, upon which revolves a double gear, *g* and *h*, the sizes of which, respectively, must be determined by the sizes of the gear-wheels *f* and *i* with reference to the degree of multiplication. The rigid post of course may be replaced by a revolving shaft, finding a bearing either on the bridge-plate or in the cap, and the gear-wheels *g* and *h* would then be so attached to it as to revolve with it. Over this operating-gear is placed a bridge, *s*, to secure it, and it may be used as an additional bearing for the central shaft; or the latter may be extended through to the cap *m*.

In Fig. 2 a check or click consisting of the usual ratchet or cog wheel, *x*, and pawl *t*, the latter operated by spring *s'*, is shown under the head-plate. This pawl is rectangular in its general outline, with a projecting finger on one side to engage the ratchet, and is pivoted on a post which extends through the head-plate *n*, and has firmly attached to it outside the head-plate a short switch-lever, *w*, by which the post and pawl may be turned into and out of operation. By this means the pawl may be thrown so as not to engage the ratchet. As will be seen, by this simple device the reel may be converted at will from a check or click reel to a free-running reel, or vice versa.

In the event of the operating-gear being placed on the head-plate, the check might be placed under either the head or tail plate, and, in fact, could be in the present arrangement.

In operation, the crank-handle, being revolved, revolves the shaft $c$, which operates the gear $f$. This engages the gear $g$, which is one-half the size of gear $f$, and, being permanently attached, gear $g$ revolves the gear $h$, which is in turn twice the diameter of gear $g$, or the same size as gear $f$. Gear-wheel $h$ engages gear-wheel $i$, which is the same size as gear-wheel $g$, and is attached to and drives the hollow spool-shaft K. The degree of multiplication will of course be determined by the relative sizes of the gears.

Having described my invention, what I claim to be new, and desire to secure by Letters Patent, is—

1. In a fishing-reel, the hollow revolving drum-shaft mounted in central bearings in the end plates, in combination with the independently-revolving driving-shaft passing therethrough and having its bearing therein, and provided with the crank and means for transmitting motion to the said hollow shaft, as set forth.

2. In a fishing-reel, the operating-gear arranged upon the tail-plate $o$, in combination with a central shaft driven by a crank on the head-plate, substantially as described.

3. In a fishing-reel, a reversible check or click consisting of the combination of the ratchet-wheel mounted on the drum-shaft, between the end plate and the spool-head, the pawl engaging therewith, the spring engaging the pawl, the post carrying the pawl and projecting through the end plate, and the switch-lever attached thereto for throwing the pawl into or out of engagement with the ratchet at will, as set forth.

FREDK. MALLESON.

Witnesses:
JAMES DEMAREST,
W. J. G. KEARNS.